Sept. 28, 1926.  
F. O. HOAGLAND  
1,601,019  
CUTTER HAVING ANGULARLY DISPOSED TEETH  
Original Filed March 27, 1924   4 Sheets-Sheet 1

Inventor  
Frank O. Hoagland

Attorneys

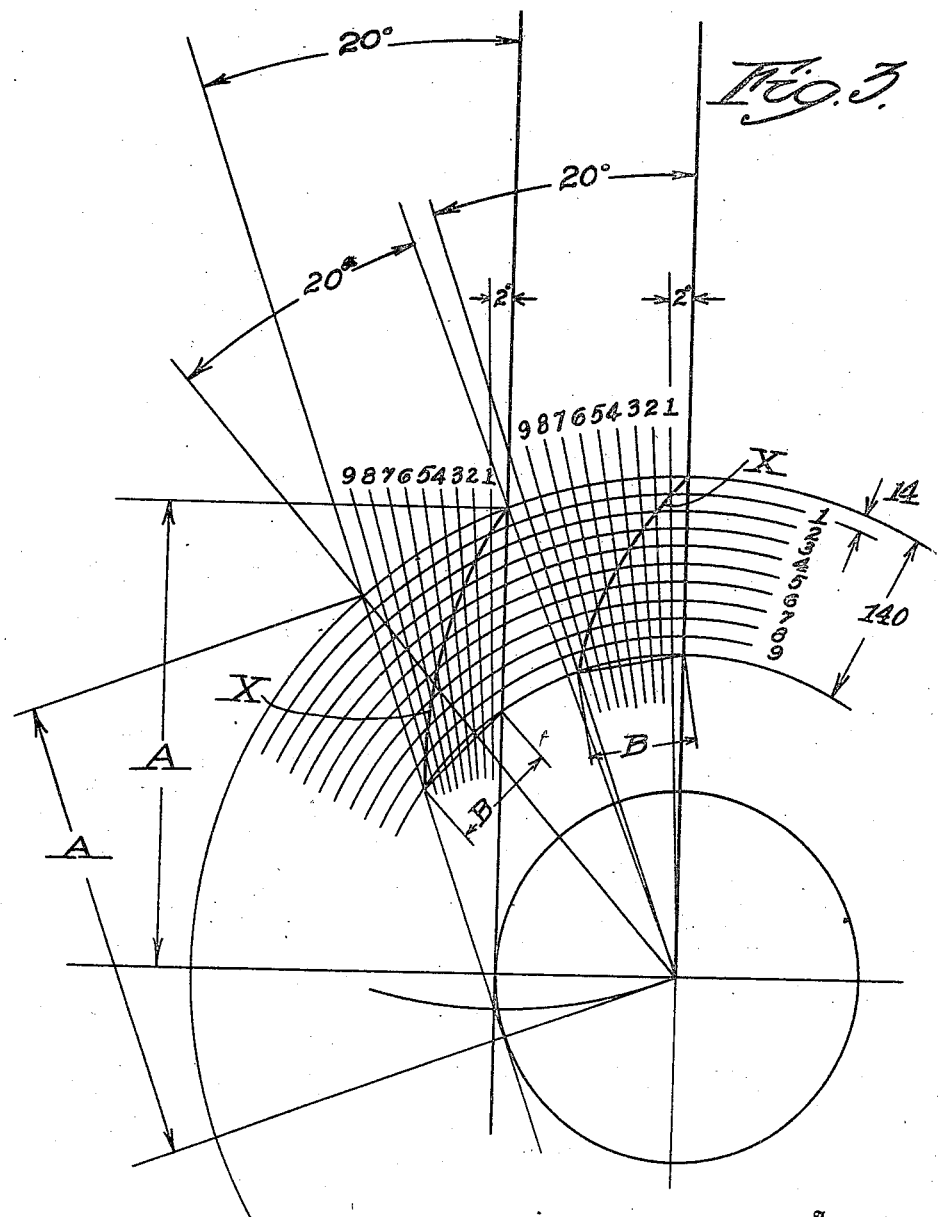

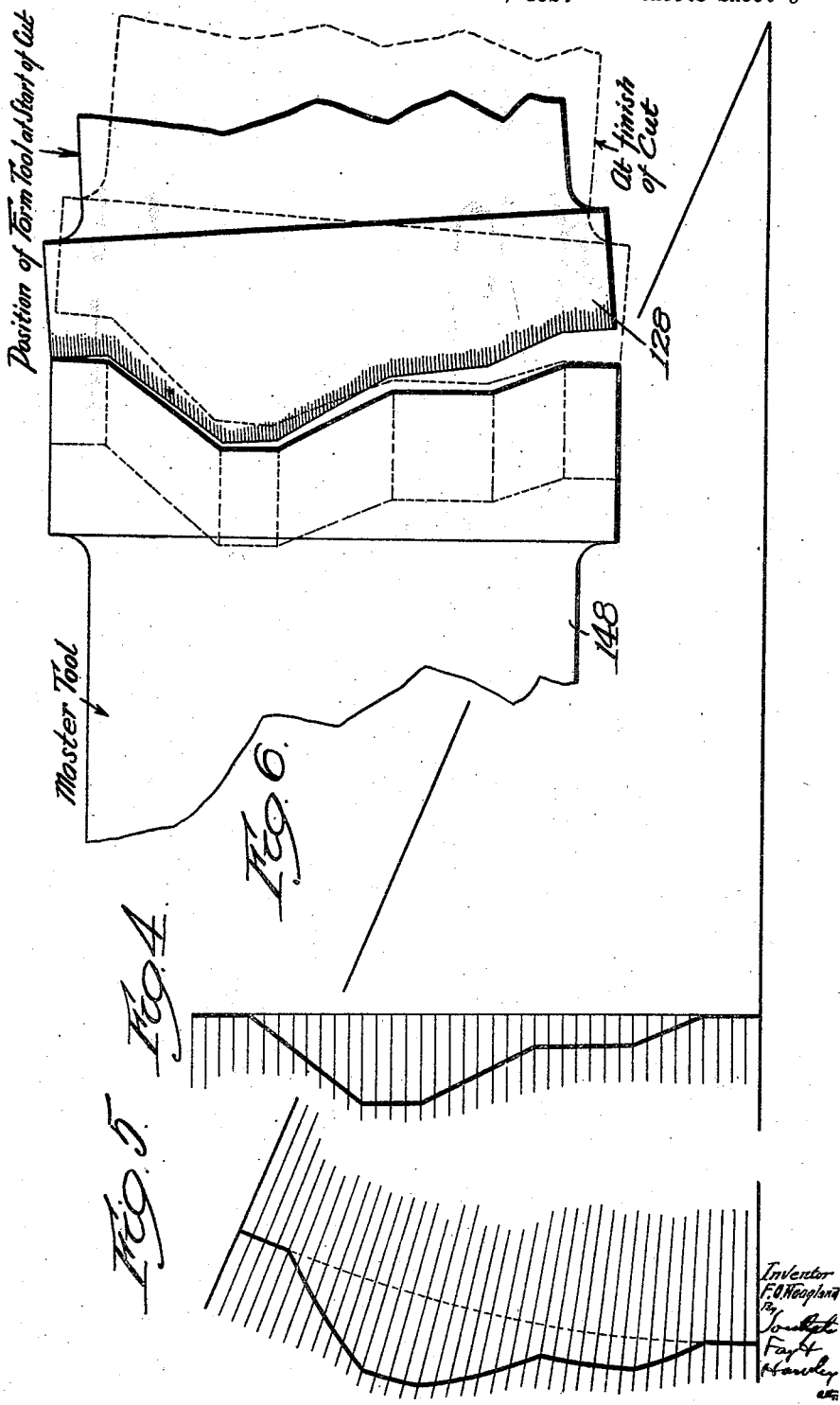

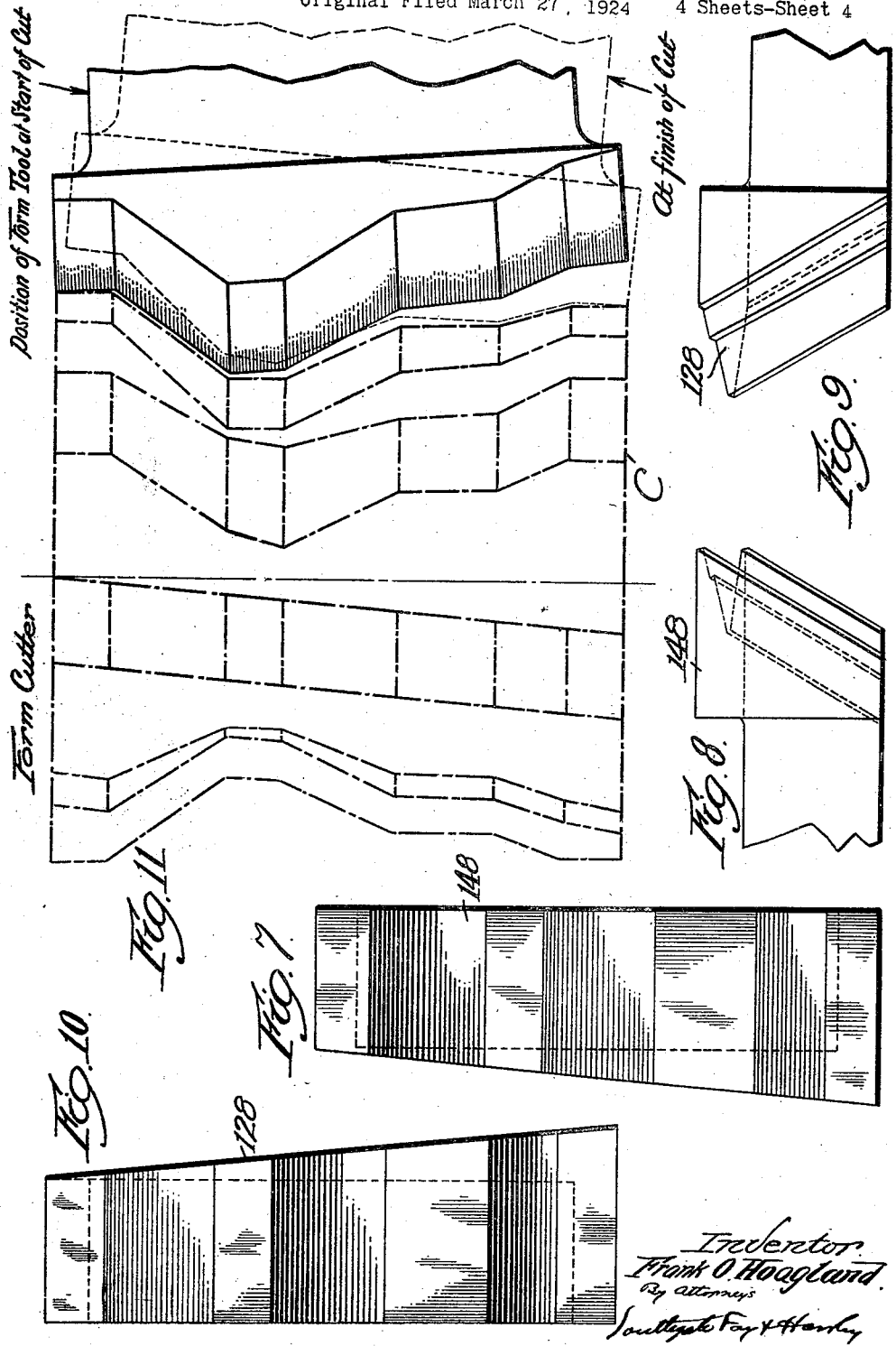

Patented Sept. 28, 1926.

1,601,019

UNITED STATES PATENT OFFICE.

FRANK O. HOAGLAND, OF BRIDGEPORT, CONNECTICUT.

CUTTER HAVING ANGULARLY-DISPOSED TEETH.

Original application filed March 27, 1924, Serial No. 702,441. Divided and this application filed December 15, 1924. Serial No. 755,998.

This invention relates to a rotary contour cutter in which the front surfaces of the teeth are flat and are arranged at an angle to a line constituting an element of a cylinder, i. e. tangent to a cone or double cone having its axis coincident with the axis of the cutter.

The principal objects of the invention are to provide a rotary cutter having teeth spaced apart like the ordinary rotary milling cutter teeth, but formed by cutting a straight groove in the work between each two adjacent teeth. This groove instead of being made by a straight cut parallel with the axis of the cutter, or a spiral cut, is formed by a straight cut at an angle to the axis of the cutter and at an angle to an element of a cylinder formed on that axis. Thus this forms teeth on the cutter which are bounded on the front side by a plane surface. This surface, however, is not radial, except at one single point, but it is tangent to a cone having the same axis as the cutter. Furthermore, the angle which a line, drawn on this flat surface in a plane perpendicular to the axis of the cutter, makes with the axis is not the same at any two points along it. It changes progressively from one end of the cutter to the other. This plane surface on the front of each tooth may start at one end in a position in which it is situated in a radial direction and I have chosen a cutter so formed to illustrate this invention. But, as stated above, this plane surface, although it does not have any curvature whatever, changes its angle all the time with respect to a radius drawn at any point.

Reference is to be had to the accompanying drawings in which

Fig. 3 is a mathematic diagram showing the relief curves of a cutter constructed like that shown in Fig. 2 but with the curves considerably exaggerated from those I have illustrated in the latter figure;

Fig. 4 is a diagrammatic view showing the form of a cutter not exactly the same in detail as the one shown in Fig. 1 as it would be if the teeth were not slanted;

Fig. 5 is a similar diagrammatic view of a cutter of the same contour as it would appear if the curvature were exaggerated.

Fig. 6 is a view of a master tool for use in forming the form tool and illustrating the rocking of the form tool to secure the cutter outline in Fig. 4;

Fig. 7 is an end view of the master tool;
Fig. 8 is a side view of the same;
Fig. 9 is a similar view of the form tool;
Fig. 10 is an end view of the form tool;
Fig. 11 is a view similar to Fig. 6 showing the formation of the cutter blank by the form tool and illustrating the rocking of the latter.

I have shown the invention as in the form of a cutter C having one end $a$ of the tooth radial (see Fig. 2) and the other end $b$ of the tooth in a plane but swinging outwardly as we progress on from one end of the cutter to the other so that this plane $a$—$b$ is tangent to an imaginary cone as stated above. This cutter is intended to be sharpened by grinding the plane face back to another plane tangent to the same cone. It is necessary to have the relief surface of the cutter such that after such grinding the cutter will be able to perform a proper cutting action at the points at which the teeth are nearest the center of the cutter as well as at the points to which they are farthest away from it.

Figure 2:
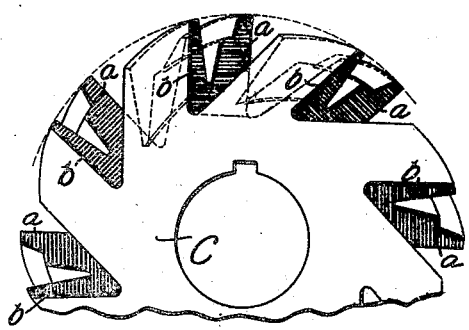
Fig. 2 is an end view of the same.

The rotary milling cutter shown in Fig. 2 has the front faces of its teeth radial at one end. However, it is to be understood that the point at which these surfaces are radial might be between the ends of the cutter, or it might be beyond the cutter i. e. imaginary. The example I have used is a practical one because it is the simplest form.

Fig. 3 is a diagram showing relief curves of a cutter of this type and showing how such curves can be developed. The vertical radial line represents the radial end edge of a tooth. The parallel line tangent to the small circle represents the opposite end edge of the same tooth. The small circle is the base of the imaginary cone to which the plane of the front of the tooth is tangent. The line from the center of the circle perpendicular to this tangent is not intended to show the radius of the circle but an element of the cone at which the above mentioned plane is tangent to the cone.

The arcs 1, 2, 3, etc. are drawn at equal distances apart, these distances equalling the drop or recession of the backing off curve. One set of straight radial lines marked 1, 2, 3, etc. are drawn from the center to represent equal angular distances as in this case 2°. The other set of straight lines 1, 2, 3, etc. are drawn in the same way but are not radial, so the two relief curves X are developed by drawing them through the successive intersections of these lines 1, 2, 3, etc. of the two sets, 1 with 1, 2 with 2, etc. They show the recession toward the center for each 2° of progress circumferentially. These two curves X are not identical and curves drawn in the same way anywhere else along the plane and cone will all be different. The two lines BB and AA are found to be respectively equal.

For making this cutter I use a contour tool 128 made with a wide face, a face as wide as the cutter being operated on is long, and it has the same contour as the cutter except that this contour is modified as will appear from a comparison of Figs. 4 and 5. If this form tool were to cut a straight line on the cutter it would not be made with a straight cutting face but that face would be modified to the extent of rounding it on an arc of the circle that has been mentioned, that is, a circle having a thirty-two foot diameter. The form tool of course will not ordinarily ever be used for cutting a straight cut all the way across but it is given the necessary contour to shape the ends of the teeth of the cutter in the proper manner and this contour is modified by curving it in the same way. As the curvature on a 16 foot radius could not be distinguished readily on drawings of this scale I have exaggerated it in Fig. 5, modifying the normal contour shown in Fig. 4, by drawing it on a one foot radius in Fig. 5. This shows the lines that otherwise would be straight are curved.

Figure 1:
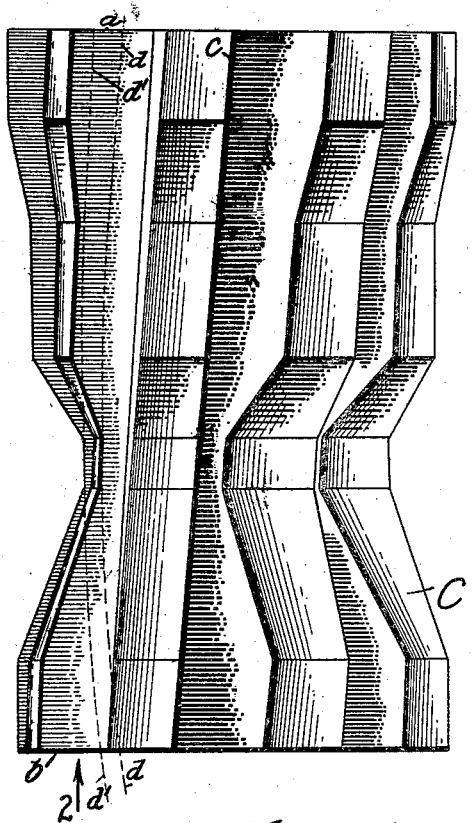
Fig. 1 is a plan of a rotary cutter embodying this invention.

The manner of shaping this form tool is indicated in Fig. 6. A master tool 148 is accurately formed by accurate hand and tool work having a single cutting edge having the exact contour of one of the teeth of the cutter C to be made. This is hardened and fixed firmly in stationary position. A single toothed form tool 128 is mounted to swing slowly on a sixteen foot radius in the plane of the master tool and caused to have movement transverse to its plane repeatedly as it swings slowly from the full line to the dotted line position shown in Fig. 6. The reciprocating motion results in shaping the form tool by the master tool to the proper shape. Its shape is the negative of the tooth of the cutter C modified by the swinging motion. Both of these tools have the necessary slant on top due to the slanting position of the teeth of the cutter C. The manufacture of the form tool by the master tool is performed on a machine not shown. The form tool 128 is arranged, for example, with its right hand end engaging the right hand end of the cutter C when the operation starts as indicated in full lines in Fig. 11. Its upper surface is inclined and its edge is located at an angle to correspond with the slant of the cutter teeth as indicated by the line $c$ in Fig. 1. All of the tool at the left of the cutting point is curved away from the cutter but on such a gradual curve that the previously blanked out cutter will be engaged and cut by a portion at least of this surface, but this is only a roughing cut. The finishing cut is being taken during the first revolution at the extreme right hand end of the form tool in the form shown. When that revolution is completed the tool is rolled along a slight distance so that during the next revolution a point at a slight distance, say one-hundredth of an inch, from the end of the cutting tool is taking its finishing cut and the rest of the tool at the left is taking another deeper roughing cut, but these parts at the left can never at this time cut to the full depth. At the same time the tool at its extreme end has moved away from the cutter and no longer comes into contact with it. This action is progressive throughout the operation of backing-off the previously formed cutter C. It will be understood from what has been said also that the tool is moved to change its elevation and to change its position each time a complete revolution is completed.

The backing-off curve X (Fig. 3) on the tooth is lengthening all the time from one end of this specific cutter to the other and by the fact that it is moving inwardly toward the center farther all the way as we progress across the cutter. It will be understood further that this form tool 128 is not set with its upper edge parallel to the axis of the work but parallel to the front face of the cutting tooth. That is, it is arranged at an angle tangent to an imaginary cone.

The operation of backing-off a cutter tooth is indicated in Fig. 11, showing the progress of the cutting tool inwardly along the cutter. It starts in the full line position and finishes in the dotted position.

It will be seen that this milling cutter has a non-spiral cutting tooth of a formation comprising a plane tooth face which is positioned to coincide with a geometric-plane that is tangential to an axial-cone, and which intersects in a variably curved elliptic arc $d$ or $d'$, a cylindrical cutter-enclosing and non-contoured rotor-form that is circular in section and concentric with the cutter-axis, and which cutting-tooth, (in any contoured form thereof) has a cutting edge located with its profile throughout the length thereof in said tangential plane, and also has said plane face rotatively retraceable (with said geometric-plane and around the cutter axis) by the grinding away of said plane-face in maintaining the cutting edge. Said cutting-tooth is proportioned and adapted for shaping to differing cutter-contours including a maximum contour coinciding with an axial-plane surface-line of said rotor-form, and has a relieving surface extending backwardly and inwardly from the cutting edge profile thereof. This relief-surface has comprised therein relief-lines located each in a plane of rotation and each extending backwardly and receding inwardly as a point-path of and from a point in the cutting edge. Said point-path relief-lines have, during a rotative-retraction of the face-plane through any given arc, recessional movement all of them along non-radial and parallel lines but by varying distances, respectively, in the geometric face-plane surface. At the same time all approach toward the cutter-axis each by the same distance, and thereby form in a more retracted face-plane position a newly-located cutting-edge having a profile differing from the profile thereof in a preceding face-plane position but having (in this newly-located cutting edge) each of said points thereof receded toward the cutter-axis by the same radial distance as all the others of said points. Thus the cutting-edge on being thus newly-located in any such more retracted face-plane position is thereby revised in profile and newly positioned for producing (on the rotating of the cutter) a precisionized milled-surface having (in a radial-to-axis plane that is perpendicular to this milled-surface) the same sectional form as was produced by the cutting-edge when this edge was in a face-plane less retracted in rotative position. Also said cutting-edge in each of said successive positions thereof and when also having the said maximum contour, has the edge-profile thereof located in and coinciding with an elliptic arc which is the line of intersection of said face-plane with the said geometric rotor-form, said cutting-edge being thereby progressively reshaped at said successive positions thereof into elliptic arcs of successively increased curvatures, respectively, and thereby continuously positioned and adapted throughout the described rotative-retractions thereof, for milling an accurately-formed plane surface.

Although I have illustrated and described only one form of the invention, I am aware of the fact that modifications can be made therein by any person skilled in the art without departing from the scope of the invention as expressed in the claims.

Therefore I do not wish to be limited to all the details of construction herein shown and described, but what I claim is:—

1. An axially-rotatable milling-cutter having a non-spiral cutting-tooth of a formation comprising a plane tooth-face which is positioned to coincide with a geometric-plane that is tangential to an axial-cone, and that intersects in a variably curved conic-section arc, a geometric cutter-enclosing and non-contoured rotor-form that is circular in section and concentric with the cutter-axis, and which cutter-tooth, (in any contoured form thereof) has a cutting edge located with its profile throughout the length thereof in such tangential plane, and also has said plane face rotatively retractable (with said geometric-plane and around the cutter axis) by the grinding away of said plane-face in maintaining the cutting edge; said cutting-tooth being adapted for shaping to different cutter-contours including a maximum contour coinciding with an axial-plane and surface-line of said rotor-form, and having a relief-surface extending backwardly and inwardly from the cutting-edge profile thereof, and this relief-surface having comprised therein relief-lines located each in a plane of rotation and each extending backwardly and receding inwardly as a point-path of and from a point in the cutting edge, and said point-path relief-lines having during a rotative-retraction of the face-plane through any given arc, recessional movement all of them along non-radial and parallel lines but by varying distances, respectively, in the geometric face-plane surface, while at the same time all approach toward the cutter-axis each by the same distance, and thereby form in a more retracted face-plane position a newly-located cutting-edge having a profile differing from the profile thereof in a preceding face-plane position, but having (in this newly-located cutting-edge) each of said points thereof receded toward the cutter-axis by the same radial distance as all the others of said points, whereby the cutting-edge on being thus newly-located in any such more retracted face-plane position is thereby revised in profile and newly positioned for producing (on the rotating of the cutter) a precisionized milled-surface having (in a radial-to-axis plane that is perpendicular to this milled-surface) the same sectional form as was produced by the cutting-edge when this edge was in a face-plane less retracted in rotative position, and, whereby, said cutting-edge in each of said successive positions thereof and when also having the same maximum contour, has the edge-profile thereof located in and coinciding with an elliptic arc which is the line of intersection of said face-plane with the said geometric rotor-form, said cutting-edge being thereby progressively reshaped at said successive positions thereof into conic-section arcs of successively increased curvatures, respectively, and thereby continuously positioned and adapted throughout the described rotative-retractions thereof, for milling an accurately formed plane surface.

2. An axially-rotatable milling-cutter having a non-spiral cutting-tooth of a formation comprising a plane tooth-face which is positioned to coincide with a geometric-plane that is tangential to an axial-cone, and that intersects in an elliptic arc, a geometric cylindrical cutter-enclosing and non-contoured rotor-form that is circular in section and concentric with the cutter-axis, and which cutting-tooth (in any contoured form thereof) has a cutting edge located with its profile throughout the length thereof in said tangential plane, and also has said plane-face rotatively retractable (with said geometric-plane and around the cutter axis), by the grinding away of said plane-face in maintaining the cutting edges, said cutting tooth being proportioned and adapted for shaping to differing cutter-contours including a maximum contour coinciding with an axial-plane and surface-line of said rotor-form, and having a relief-surface extending backwardly and inwardly from the cutting-edge profile thereof, and this relief-surface having comprised therein relief-lines located each in a plane of rotation and each extending backwardly and receding inwardly as a point-path of and from a point in the cutting edge, and said point-path relief-lines having during a rotative-retraction of the face-plane through any given arc, recessional movement all of them along non-radial and parallel lines but by varying distances, respectively, in the geometric face-plane surface, while at the same time all approach toward the cutter-axis each by the same distance, and thereby form in a more retracted face-plane position a newly-located cutting-edge having a profile differing from the profile thereof in a preceding face-plane position, but having (in this newly-located cutting edge) each of said points thereof receded toward the cutter-axis by the same radial distance as all the others of said points, whereby the cutting-edge on being thus newly-located in any such more retracted face-plane position is thereby revised in profile and newly positioned for producing (on the rotating of the cutter) a precisionized milled-surface having (in a radial-to-axis plane that is perpendicular to this milled-surface) the same sectional form as was produced by the cutting-edge when this edge was in a face-plane less retracted in rotative position, and whereby said cutting edge in each of said successive positions thereof and when also having the said maximum contour, has the edge-profile thereof located in and coinciding with an elliptic arc which is the line of intersection of said face-plane with the said geometric-rotor-form, said cutting edge being thereby progressively reshaped at said successive positions thereof into elliptic arcs of successively increased curvatures, respectively and thereby continuously positioned and adapted throughout the described rotative retractions thereof, for milling an accurately-formed plane surface.

3. A rotatable contour milling cutter having a cutting tooth bounded on the front by a true plane tangent to an imaginary axial cone and having a relief surface extending from its contour cutting edge back of said plane and inwardly, of such form that upon the retraction of the face plane by grinding it back to another plane tangent to the same imaginary cone, the distances from the axis of points along the contour cutting edge will be changed in varying degrees but all will approach the cutter axis each by the same distance and thereby form in a more retracted face plane position, a new contour edge having a profile differing from the original cutting edge profile but having each of the points thereon receded toward the cutter axis by the same radial distance as all the other of said points, whereby the shape of the contour cutting edge profile of the tooth will be slightly modified but it will still cut the same contour on the work.

4. A rotatable contour milling cutter having a cutting tooth bounded on the front by a true plane tangent to an imaginary axial cone and having a relief surface extending from its contour cutting edge back of said plane and inwardly, of such form that upon the retraction of the face plane by grinding it back to another plane tangent to the same imaginary cone, the shape of the contour cutting edge profile of the tooth will be slightly modified but it will still cut the same contour on the work.

In testimony whereof I have hereunto affixed my signature.

FRANK O. HOAGLAND.